United States Patent
Goel

(10) Patent No.: US 11,240,143 B2
(45) Date of Patent: Feb. 1, 2022

(54) EMBEDDED NETWORK PACKET DATA FOR USE OF ALTERNATIVE PATHS WITHIN A GROUP OF NETWORK DEVICES

(71) Applicant: Fungible, Inc., Santa Clara, CA (US)

(72) Inventor: Deepak Goel, San Jose, CA (US)

(73) Assignee: Fungible, Inc., Santa Clara, CA (US)

( * ) Notice: Subject to any disclaimer, the term of this patent is extended or adjusted under 35 U.S.C. 154(b) by 0 days.

(21) Appl. No.: 16/863,730

(22) Filed: Apr. 30, 2020

(65) Prior Publication Data

US 2020/0351195 A1 Nov. 5, 2020

Related U.S. Application Data

(60) Provisional application No. 62/842,001, filed on May 2, 2019.

(51) Int. Cl.
*H04L 12/707* (2013.01)
*H04L 12/703* (2013.01)
*H04L 12/721* (2013.01)

(52) U.S. Cl.
CPC .............. *H04L 45/22* (2013.01); *H04L 45/12* (2013.01); *H04L 45/24* (2013.01); *H04L 45/28* (2013.01)

(58) Field of Classification Search
CPC combination set(s) only.
See application file for complete search history.

(56) References Cited

U.S. PATENT DOCUMENTS

| 10,686,729 B2 | 6/2020 | Sindhu et al. |
| 10,725,825 B2 | 7/2020 | Sindhu et al. |
| 2006/0072566 A1 * | 4/2006 | El-Amawy ......... H04J 14/0227 370/389 |
| 2007/0047465 A1 * | 3/2007 | Kano ..................... H04L 45/04 370/254 |
| 2009/0168721 A1 * | 7/2009 | Chen .................... H04W 8/082 370/331 |
| 2012/0147883 A1 * | 6/2012 | Uttaro .................... H04L 45/22 370/389 |

(Continued)

OTHER PUBLICATIONS

U.S. Appl. No. 16/939,617, filed Jul. 27, 2020, naming inventors Sindhu et al.

(Continued)

*Primary Examiner* — Xavier S Wong
(74) *Attorney, Agent, or Firm* — Shumaker & Sieffert, P.A.

(57) ABSTRACT

This disclosure describes techniques for addressing and/or accounting for path failures (e.g., congestion, link failures, disconnections, or other types of failures) within a network environment. In one example, this disclosure describes a method that includes receiving, by a node connected to a plurality of interconnected nodes, a network packet to be forwarded to a destination node; identifying, by a forwarding plane within the node, a first link along a path to the destination node; determining, by the forwarding plane, that the first link is inoperable; storing, by the node and within the network packet, data identifying the node as having been visited; identifying, by the forwarding plane and from among the plurality of egress links from the node, a second link that is operable and is along an alternative path to the destination node; and transmitting the network packet over the second link.

17 Claims, 10 Drawing Sheets

(56) References Cited

U.S. PATENT DOCUMENTS

| | | | |
|---|---|---|---|
| 2015/0372898 A1* | 12/2015 | Haramaty | H04L 49/557 370/225 |
| 2016/0254991 A1* | 9/2016 | Eckert | H04L 69/22 370/225 |
| 2017/0093732 A1* | 3/2017 | Akhavain Mohammadi | H04L 45/72 |
| 2019/0012278 A1 | 1/2019 | Sindhu et al. | |
| 2019/0104207 A1 | 4/2019 | Goel et al. | |
| 2019/0158428 A1 | 5/2019 | Gray et al. | |
| 2019/0215266 A1* | 7/2019 | Filsfils | H04L 45/125 |
| 2019/0289102 A1 | 9/2019 | Goel et al. | |
| 2020/0120012 A1* | 4/2020 | Meredith | H04L 45/123 |

OTHER PUBLICATIONS

U.S. Appl. No. 16/901,991, filed Jun. 15, 2020, naming inventors Sindhu et al.

* cited by examiner

EMBEDDED NETWORK PACKET DATA FOR USE OF ALTERNATIVE PATHS WITHIN A GROUP OF NETWORK DEVICES

CROSS REFERENCE

This application claims the benefit of U.S. Provisional Patent Application No. 62/842,001 filed on May 2, 2019, which is hereby incorporated by reference herein in its entirety.

TECHNICAL FIELD

The disclosure relates to computer networks and, more particularly, data center networks.

BACKGROUND

A computer network is a collection of interconnected computing devices that can exchange data and share resources. In a packet-based network, such as an Ethernet network, computing devices typically communicate data by dividing the data into small blocks called packets, which are individually routed across the network from a source device to a destination device. A variety of intermediate devices operate to route the packets between the computing devices. For example, a computer network may include routers, switches, gateways, firewalls, and a variety of other devices to provide and facilitate network communication.

As one example, in a typical cloud-based data center, a large collection of interconnected servers provides computing and/or storage capacity for execution of various applications. For instance, a data center may comprise a facility that hosts applications and services for subscribers, i.e., customers of the data center. The data center may host all of the infrastructure equipment, such as compute nodes, networking and storage systems, power systems, and environmental control systems.

In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy. A typical data center switch fabric includes multiple tiers of interconnected switches and routers. In current implementations, packets for a given packet flow between a source server and a destination server or storage system are typically forwarded from the source to the destination along a single path through the routers and switches comprising the switching fabric. In a large scale fabric, failure rates are often significant, even if single component failure rates are quite small. Recovery from failure may involve control plane software determining new paths and updating forwarding tables to address detected failures. However, such processes can be time-consuming.

SUMMARY

This disclosure describes techniques for addressing and/or accounting for path failures (e.g., congestion, link failures, disconnections, or other types of failures) within a network environment. In some examples, such techniques involve detecting, within a group of network devices or nodes that are part of a larger network, inoperable paths between network devices, and in response to detecting such inoperable paths, choosing alternative paths within the group of network devices. As further described herein, by detecting such inoperable paths, the network devices may be able to choose alternative paths and route packets to their destination with little or no involvement from components of the control planes of the network devices and instead by forward components (data plane) of the network devices. By doing so, the network devices may also avoid packet loss that might otherwise occur if the network devices were to wait for the control plane to determine one or more new paths avoiding the inoperable paths.

For example, this disclosure describes techniques in which data is stored that reflects the individual network devices that a given packet has already visited while traversing a network (e.g., after originating from a source of the packet and prior to arriving at a destination of the packet), thereby enabling other network devices (e.g., routers/switches) to avoid inefficiently forwarding the packet to a network device that has already been visited while being forward toward the destination. In some examples, the data reflecting the network devices that a given packet has visited is stored in the form of a vector within that network packet and may be updated as the network packet traverses the network. The vector may reflect nodes or network devices that the network packet has previously visited, and may be updated as a packet is forwarded by network devices to reflect network devices that the packet has visited.

Techniques described herein may provide certain technical advantages and/or solutions. For instance, in examples where a group of network devices are capable of detecting inoperable or failed paths, and choosing alternative paths, packet loss may be prevented that might otherwise occur if the network devices waited for the control plane to determine new routes that avoid the inoperable paths. As a result, fewer packets may be dropped.

Also, in examples where the control plane has little or no involvement in identifying alternative routes within a group of network devices, it may be possible to avoid revealing information about internal path or other failures that may occur within that group of network devices. In some cases, if information about internal path or other internal failures becomes apparent, external systems might take action in response to such failures, which might not be warranted or desirable. As a result, techniques in accordance with one or more aspects of the present disclosure might prevent inefficiencies by preventing unnecessary operations by external systems.

Also, in examples where data reflecting network devices that a given packet has visited is maintained, techniques described herein may ensure that packets are not forwarded in a path loop. As a result, techniques in accordance with one or more aspects of the present disclosure might prevent forwarding network packets in an inefficient or unproductive loop among a small number of network devices. In some cases, such loops can be identified early, and an appropriate action can be taken (e.g., dropping the packet) prior to needlessly consuming network resources by forwarding the packet in the loop.

In some examples, this disclosure describes operations performed by a network router, node, or other network device in accordance with one or more aspects of this disclosure. In one specific example, this disclosure describes a method comprising receiving, by a node connected to a plurality of interconnected nodes, a network packet to be forwarded to a destination node, wherein the destination node is included within the plurality of interconnected nodes; identifying, by the node and from among a plurality of egress links from the node, a first link along a path to the destination node; determining, by the node, that the first link is inoperable; storing, by the node and within the network packet, data identifying the node as having been visited; identifying, by the node and from among the plurality of egress links from the node, a second link that is operable and is along an alternative path to the destination node; and transmitting, by the node, the network packet over the second link.

In another specific example, this disclosure describes a method comprising receiving, by a node included within a plurality of interconnected nodes, a network packet to be forwarded to a destination node, wherein the destination node is included within the plurality of interconnected nodes; identifying, by the node and from among a plurality of egress links from the node, a first link along a path to the destination node; determining, by the node and based on visited node data stored within the network packet, that the first link leads to a node that the network packet has previously visited; updating, by the node, the visited node data to identify the node as having been visited by the network packet; identifying, by the node and from among the plurality of egress links from the node, a second link that does not lead to (or connect to) another node that the network packet has previously visited and is along an alternative path to the destination node; and transmitting, by the node, the network packet over the second link.

The details of one or more examples are set forth in the accompanying drawings and the description below. Other features, objects, and advantages of the techniques described herein will be apparent from the description and drawings, and from the claims.

DETAILED DESCRIPTION

Figure 1:
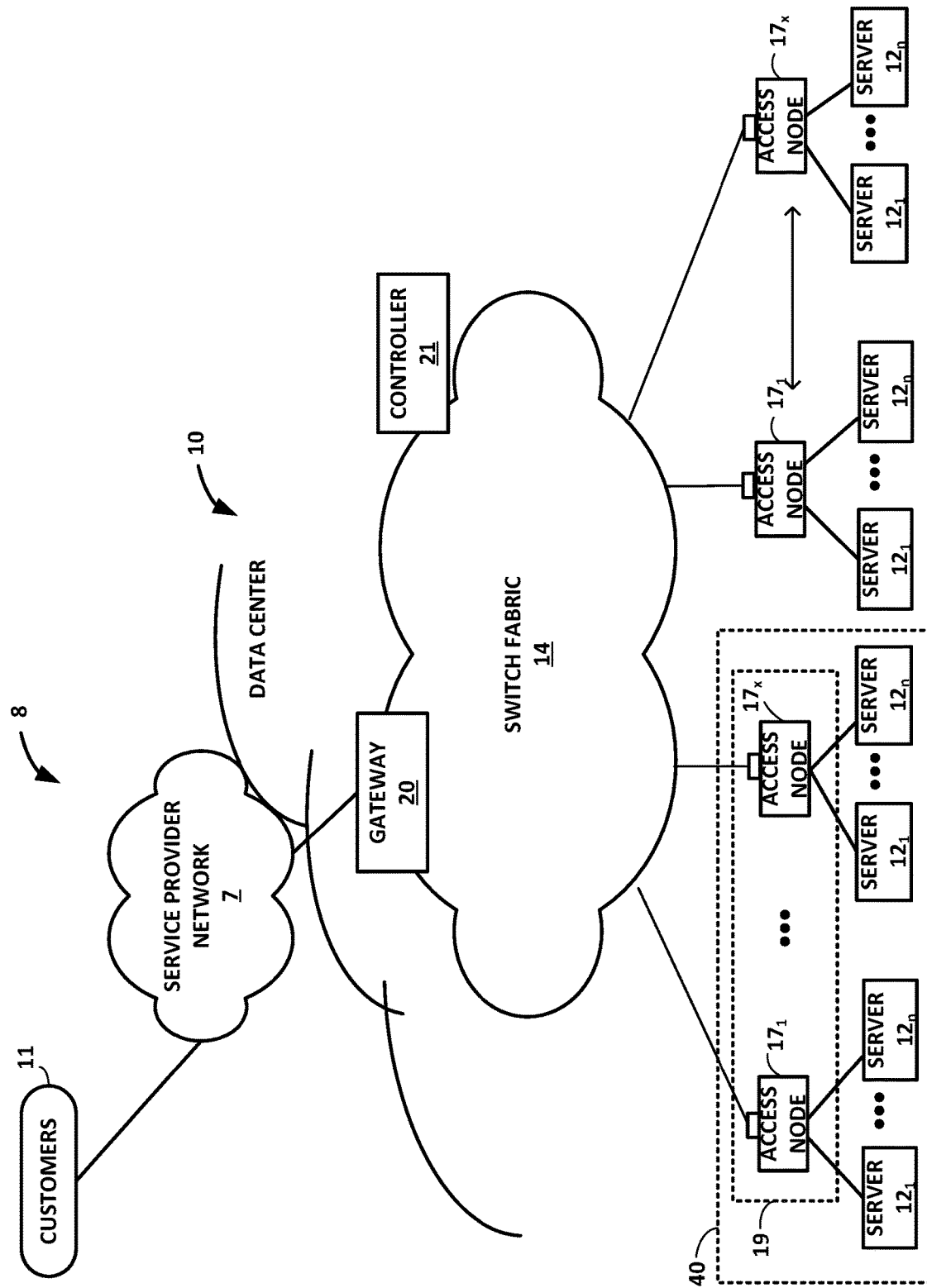
FIG. 1 is a block diagram illustrating an example system having a data center in which examples of the techniques described herein may be implemented.

FIG. 1 is a block diagram illustrating an example system 8 having a data center 10 in which examples of the techniques described herein may be implemented. In general, data center 10 provides an operating environment for applications and services for customers 11 coupled to the data center by content/service provider network 7 and gateway device 20. In other examples, content/service provider network 7 may be a data center wide-area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet. Although described for purposes of example in reference to a data center, the techniques described herein may, in some example implementations, be applied to computer networks generally, including access networks, enterprise networks, service provider networks, distributed and/or redundant data centers or other computing environments.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the example of FIG. 1, data center 10 includes a set of storage systems and application servers 12 interconnected via a high-speed switch fabric 14. In some examples, servers 12 are arranged into multiple different server groups, each including any number of servers up to, for example, n servers $12_1$-$12_N$. Servers 12 provide computation and storage facilities for applications and data associated with customers 11 and may be physical (bare-metal) servers, virtual machines running on physical servers, virtualized containers running on physical servers, or combinations thereof. Servers 12 and associated storage devices may be included within one or more network storage compute units (NSCU) 40. In the example of FIG. 1, each of NSCUs 40 include one or more access node groups 19 and supported servers 12.

In the example of FIG. 1, software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10 in accordance with one or more aspects of this disclosure. In some examples, SDN controller 21 may operate in response to configuration input received from a network administrator.

In some examples, SDN controller 21 operates to configure access nodes 17 to logically establish one or more virtual fabrics as overlay networks dynamically configured on top of the physical underlay network provided by switch fabric 14, in accordance with the techniques described herein. Virtual fabrics and the operation of access nodes to establish virtual fabrics are described in U.S. Provisional Patent Application No. 62/638,788, filed Mar. 5, 2018, entitled "Network Access Node Virtual Fabrics Configured Dynamically Over An Underlay Network," the entire content of which is incorporated herein by reference.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, each of servers 12 is coupled to switch fabric 14 by an access node 17 for processing streams of information, such as network packets or storage packets. As further described herein, in one example, each access node 17 is a highly programmable I/O processor specially designed for offloading certain functions from servers 12. In one example, each of access nodes 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (e.g., with zero copy in server memory) and storage acceleration for the attached server systems. In one example, each access node 17 may be implemented as one or more application-specific integrated circuit (ASIC) or other hardware and software components, each supporting a subset of the servers.

Access nodes 17 may also be referred to as data processing units (DPUs), or devices including DPUs. In other words, the term access node may be used herein interchangeably with the term DPU. Additional example details of various example DPUs are described in U.S. patent application Ser. No. 16/031,921, filed Jul. 10, 2018, entitled "Data Processing Unit for Compute Nodes and Storage Nodes," and U.S. patent application Ser. No. 16/031,945, filed Jul. 10, 2018, entitled "Data Processing Unit for Stream Processing," the entire content of each of which is incorporated herein by reference.

In example implementations, access nodes 17 are configurable to operate in a standalone network appliance having one or more access nodes. In other examples, each access node may be implemented as a component (e.g., electronic chip) within a device, such as a compute node, application server, storage server, and may be deployed on a motherboard of the device or within a removable card, such as a storage and/or network interface card. Further, access nodes 17 may be arranged into multiple different access node groups 19, each including any number of access nodes up to, for example, x access nodes $17_1$-$17_x$. As such, multiple access nodes 17 may be grouped (e.g., within a single electronic device or network appliance), referred to herein as an access node group 19, for providing services to a group of servers supported by the set of access nodes internal to the device. In one example, an access node group 19 may comprise four access nodes 17, each supporting four servers so as to support a group of sixteen servers.

In the example of FIG. 1, each access node 17 provides connectivity to switch fabric 14 for a different group of servers 12 and may be assigned respective IP addresses and provide routing operations for the servers 12 coupled thereto. As described herein, access nodes 17 provide routing and/or switching functions for communications from/directed to the individual servers 12. For example, as shown in FIG. 1, each access node 17 includes a set of edge-facing electrical or optical local bus interfaces for communicating with a respective group of servers 12 and one or more core-facing electrical or optical interfaces for communicating with core switches within switch fabric 14. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. Various example architectures of access nodes 17 are described herein. In some examples, the architecture of each access node 17 comprises a multiple core processor system that represents a high performance, hyper-converged network, storage, and data processor and input/output hub. In these examples, the architecture of each access node 17 is optimized for high performance and high efficiency stream processing.

More details on the data center network architecture and example access nodes are available in U.S. patent application Ser. No. 15/939,227, Mar. 28, 2018, entitled "Non-Blocking Any-to-Any Data Center Network with Packet Spraying Over Multiple Alternate Data Paths," and U.S. Patent Application Ser. No. 62/589,427, filed Nov. 21, 2017, entitled "WORK UNIT STACK DATA STRUCTURES IN MULTIPLE CORE PROCESSOR SYSTEM," the entire content of each of which is incorporated herein by reference.

Although not shown in FIG. 1, access nodes 17 may be directly coupled to each other, such as direct coupling between access nodes in a common access node group 19, to provide direct interconnectivity between the access nodes of the same group. For example, multiple access nodes 17 (e.g., 4 access nodes) may be positioned within a common access node group 19 for servicing a group of servers (e.g., 16 servers).

As one example, each access node group 19 of multiple access nodes 17 may be configured as standalone network device, and may be implemented as a two rack unit (2RU) device that occupies two rack units (e.g., slots) of an equipment rack. In another example, access node 17 may be integrated within a server, such as a single 1RU server in which four CPUs are coupled to the forwarding ASICs described herein on a mother board deployed within a common computing device. In yet another example, one or more of access nodes 17 and servers 12 may be integrated in a suitable size (e.g., 10RU) frame that may, in such an example, become a network storage compute unit (NSCU) for data center 10. For example, an access node 17 may be integrated within a mother board of a server 12 or otherwise co-located with a server in a single chassis.

As described herein, some or all of access nodes 17 may be capable of determining when links to other access nodes 17 (e.g., within access node group 19 and/or NSCU 40) are inoperable. Such inoperability may be due to congestion, connectivity problems, loss of light, or other conditions. When an access node 17 identifies an inoperable link to another network device, a forward plane (e.g., packet forwarding hardware) of that access node 17 identifies an alternative path that avoids the inoperable link. Rather than dropping network packets that would otherwise be transmitted over the inoperable link, the forwarding plane of access node 17 may forward the network packets to other access nodes 17 over a different link along the alternative path. In this way, access nodes 17 may dynamically adjust the path followed by network packets to account for inoperable links, and may do so with little or no involvement from a control plane of that access node. By avoiding involvement from the control plane or otherwise waiting for the control plane to modify forwarding tables of the forwarding plane, action can be taken more quickly, and fewer packets may be dropped. As a result, access nodes 17 within FIG. 1 may operate more efficiently and process network packets more reliably.

In some examples, access nodes 17 may store information within a packet itself about the path that network packet has taken while traversing a group of access nodes 17 (e.g., within NSCU 40 or within a logical or physical rack), such as when that network packet is forwarded along an alternative path to thereby avoid an inoperable link. By storing information about the alternative path taken (e.g., within the packet itself), the forwarding planes of access nodes 17 can more easily determine which access nodes have already forwarded a network packet. In this way, access node 17 can avoid forwarding network packets along inefficient paths, and for example, access nodes 17 can prevent network packets from traveling in a loop within the group of access nodes. One way for access nodes 17 to store such information is for one or more access nodes 17 to embed a bit vector within network packets that have been forwarded along alternative paths. In such an implementation, each bit in the vector may represent one of access nodes 17, and each node 17 can set its corresponding bit within the vector when the network packet is processed by the forwarding plane (e.g., packet forwarding hardware) of that node 17. Each node 17 can also evaluate the bit vector when making forwarding decisions, and avoid forwarding a network packet to a node within the group of access nodes 17 that the network packet has already visited. By ensuring that a network packet is not forwarded to any given node 17 more than once, inefficient or looped paths may be avoided.

Figure 2A:
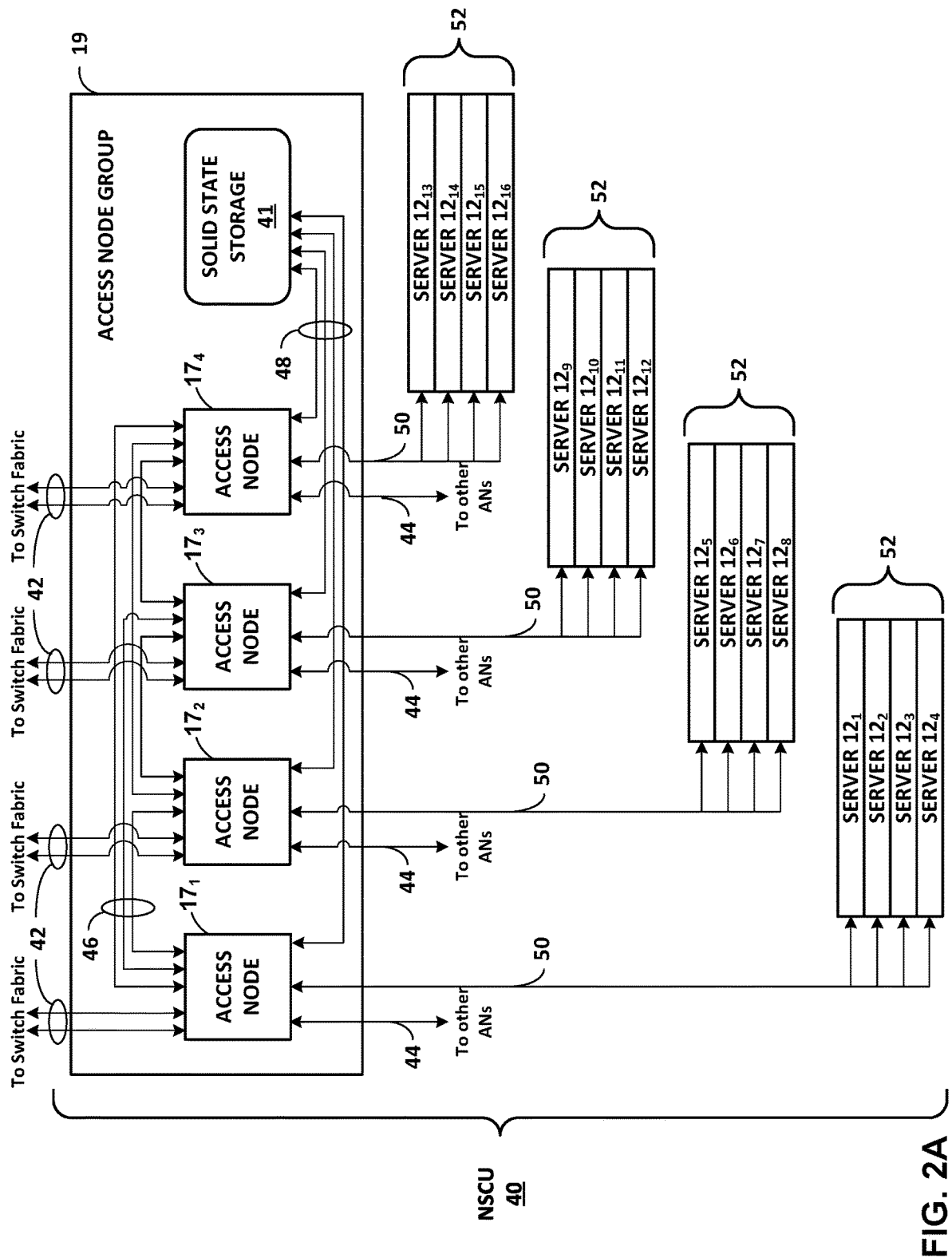
FIG. 2A is a block diagram illustrating one example of network storage compute unit (NSCU) including an access node group and supported servers.

FIG. 2A is a block diagram illustrating one example of network storage compute unit (NSCU) 40 including an access node group 19 and supported servers 12. Access node group 19 may be configured to operate as a high-performance I/O hub designed to aggregate and process network and storage I/O to groups of multiple servers 52. In the particular example of FIG. 2A, access node group 19 includes four access nodes $17_1$-$17_4$ (collectively, "access nodes 17") connected to a pool of local solid state storage devices 41. In the illustrated example, access node group 19 supports a total of sixteen server nodes $12_1$-$12_{16}$ (collectively, "server nodes 12") with each of the four access nodes 17 within access node group 19 supporting four of server nodes 12. In some examples, each of the four server nodes 12 supported by each of the access nodes 17 may be arranged as a server 52. In some examples, the "servers 12" described throughout this application may be dual-socket or dual-processor "server nodes" that are arranged in groups of two or more within a standalone server device, e.g., servers 52.

Although access node group 19 is illustrated in FIG. 2A as including four access nodes 17 that are all connected to a single pool of solid state storage 41, an access node group may be arranged in other ways. In one example, each of the four access nodes 17 may be included on an individual access node sled that also includes solid state storage and/or other types of storage for the access node. In this example, an access node group may include four access node sleds each having an access node and a set of local storage devices.

In one example implementation, access nodes 17 within access node group 19 connect to servers 52 and solid state storage 41 using Peripheral Component Interconnect express (PCIe) links 48, 50, and connect to other access nodes and the datacenter switch fabric 14 using Ethernet links 42, 44, 46. For example, each of access nodes 17 may support six high-speed Ethernet connections, including two externally-available Ethernet connections 42 for communicating with the switch fabric, one externally-available Ethernet connection 44 for communicating with other access nodes in other access node groups, and three internal Ethernet connections 46 for communicating with other access nodes 17 in the same access node group 19. In one example, each of externally-available connections 42 may be a 100 Gigabit Ethernet (GE) connection. In this example, access node group 19 has 8×100 GE externally-available ports to connect to the switch fabric 14.

Within access node group 19, connections 42 may be copper, i.e., electrical, links arranged as 8×25 GE links between each of access nodes 17 and optical ports of access node group 19. Between access node group 19 and the switch fabric, connections 42 may be optical Ethernet connections coupled to the optical ports of access node group 19. The optical Ethernet connections may connect to one or more optical devices within the switch fabric, e.g., optical permutation devices described in more detail below. The optical Ethernet connections may support more bandwidth than electrical connections without increasing the number of cables in the switch fabric. For example, each optical cable coupled to access node group 19 may carry 4×100 GE optical fibers with each fiber carrying optical signals at four different wavelengths or lambdas. In other examples, the externally-available connections 42 may remain as electrical Ethernet connections to the switch fabric.

The four remaining Ethernet connections supported by each of access nodes 17 include one Ethernet connection 44 for communication with other access nodes within other access node groups, and three Ethernet connections 46 for communication with the other three access nodes within the same access node group 19. In some examples, connections 44 may be referred to as "inter-access node group links" and connections 46 may be referred to as "intra-access node group links."

Ethernet connections 44, 46 provide full-mesh connectivity between access nodes within a given structural unit. In one example, such a structural unit may be referred to herein as a logical rack (e.g., a half-rack or a half physical rack) that includes two NSCUs 40 having two AGNs 19 and supports an 8-way mesh of eight access nodes 17 for those AGNs. In this particular example, connections 46 may provide full-mesh connectivity between the four access nodes 17 within the same access node group 19, and connections 44 may provide full-mesh connectivity between each of access nodes 17 and four other access nodes within one other access node group of the logical rack (i.e., structural unit). In addition, access node group 19 may have enough, e.g., sixteen, externally-available Ethernet ports to connect to the four access nodes in the other access node group.

In the case of an 8-way mesh of access nodes, i.e., a logical rack of two NSCUs 40, each of access nodes 17 may be connected to each of the other seven access nodes by a 50 GE connection. For example, each of connections 46 between the four access nodes 17 within the same access node group 19 may be a 50 GE connection arranged as 2×25 GE links. Each of connections 44 between the four access nodes 17 and the four access nodes in the other access node group may include four 50 GE links. In some examples, each of the four 50 GE links may be arranged as 2×25 GE links such that each of connections 44 includes 8×25 GE links to the other access nodes in the other access node group.

In another example, Ethernet connections 44, 46 provide full-mesh connectivity between access nodes within a given structural unit that is a full-rack or a full physical rack that includes four NSCUs 40 having four AGNs 19 and supports a 16-way mesh of access nodes 17 for those AGNs. In this example, connections 46 provide full-mesh connectivity between the four access nodes 17 within the same access node group 19, and connections 44 provide full-mesh connectivity between each of access nodes 17 and twelve other access nodes within three other access node group. In addition, access node group 19 may have enough, e.g., forty-eight, externally-available Ethernet ports to connect to the four access nodes in the other access node group.

In the case of a 16-way mesh of access nodes, each of access nodes 17 may be connected to each of the other fifteen access nodes by a 25 GE connection, for example. In other words, in this example, each of connections 46 between the four access nodes 17 within the same access node group 19 may be a single 25 GE link. Each of connections 44 between the four access nodes 17 and the twelve other access nodes in the three other access node groups may include 12×25 GE links.

As shown in FIG. 2A, each of access nodes 17 within an access node group 19 may also support a set of high-speed PCIe connections 48, 50, e.g., PCIe Gen 3.0 or PCIe Gen 4.0 connections, for communication with solid state storage 41 within access node group 19 and communication with servers 52 within NSCU 40. Each of servers 52 includes four server nodes 12 supported by one of access nodes 17 within access node group 19. Solid state storage 41 may be a pool of Non-Volatile Memory express (NVMe)-based solid state drive (SSD) storage devices accessible by each of access nodes 17 via connections 48.

In one example, solid state storage 41 may include twenty-four SSD devices with six SSD devices for each of access nodes 17. The twenty-four SSD devices may be arranged in four rows of six SSD devices with each row of SSD devices being connected to one of access nodes 17. Each of the SSD devices may provide up to 16 Terabytes (TB) of storage for a total of 384 TB per access node group 19. In some cases, a physical rack may include four access node groups 19 and their supported servers 52. In that case, a typical physical rack may support approximately 1.5 Petabytes (PB) of local solid state storage. In another example, solid state storage 41 may include up to 32 U. 2×4 SSD devices. In other examples, NSCU 40 may support other SSD devices, e.g., 2.5" Serial ATA (SATA) SSDs, mini-SATA (mSATA) SSDs, M.2 SSDs, and the like.

In the above described example in which each of the access nodes 17 is included on an individual access node sled with local storage for the access node, each of the access node sleds may include four SSD devices and some additional storage that may be hard drive or solid state drive devices. In such an example, the four SSD devices and the additional storage may provide approximately the same amount of storage per access node as the six SSD devices described in the previous example.

As described herein, each of access nodes 17 within access node group 19 may determine when links (e.g., links 45, 46, or others) to other access nodes 17 within access node group 19 are inoperable. When an access node 17 identifies an inoperable link that would otherwise be used to forward a network packet, that access node 17 identifies an alternative path that avoids the inoperable link. When an access node 17 chooses to forward a network packet along alternative path, that access node 17 may embed a bit vector within the network packet to identify the access nodes 17 being visited, and later access nodes that process the network packet may also update the bit vector reflect other nodes that the network packet has visited. As the packet is forwarded, subsequent access nodes 17 make determinations about where to forward the network packet by evaluating the bit vector so as to avoid forwarding the network packet along paths that connect to or lead to access nodes 17 that have already been visited. Such a procedure tends to ensure that the network packet is forwarded along only efficient and/or non-looped paths.

Figure 2B:
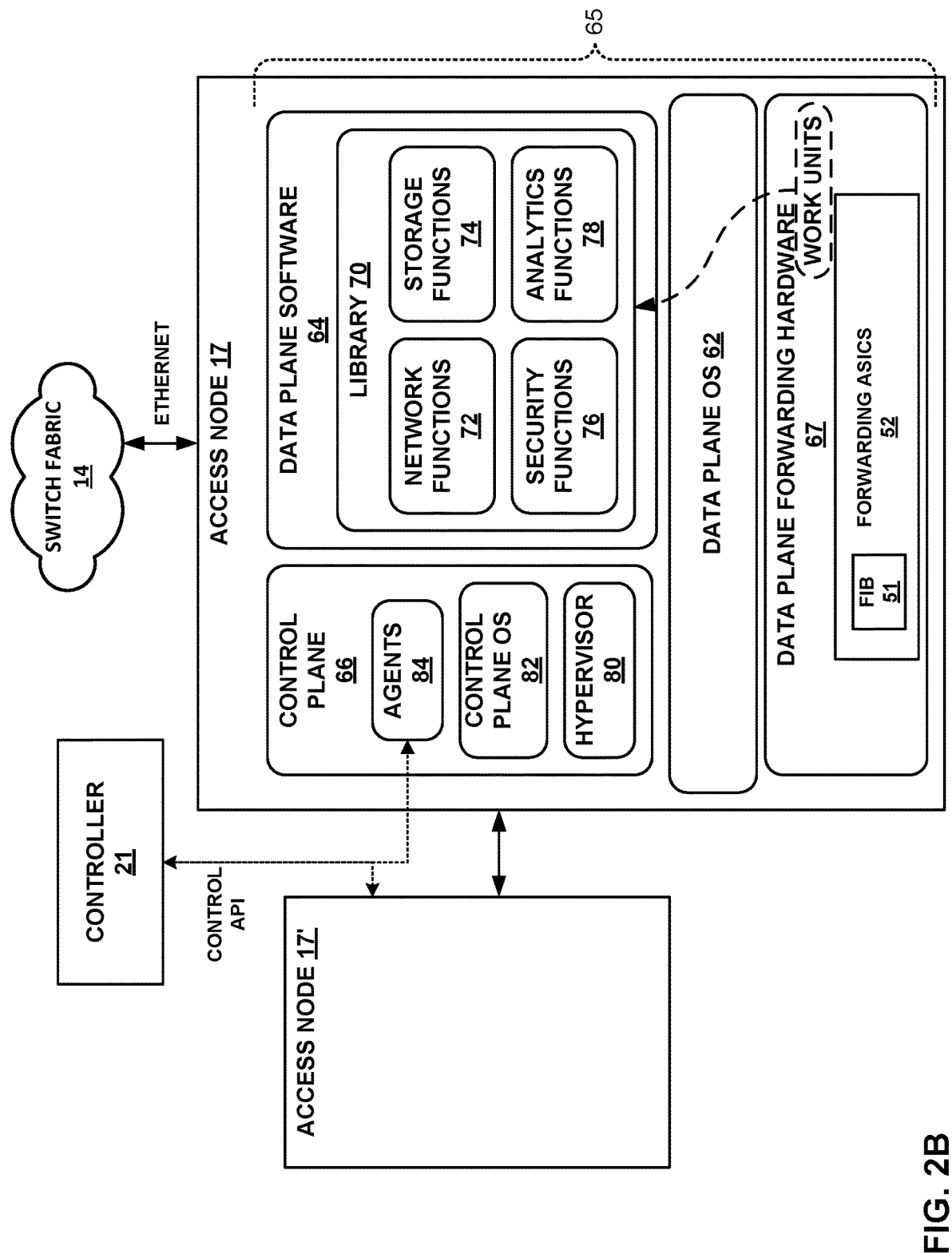
FIG. 2B is a block diagram illustrating one example of an access node connected to another access node.

FIG. 2B is a block diagram illustrating an access node 17 as an example network device having both a control plane 66 and data plane 65, where the access node 17 is configured to forward network packets, in accordance with the techniques of this disclosure. In this example, data plane 65 includes data plane forwarding hardware 67 having one or more hardware-implemented forwarding circuits (e.g., ASICs, custom integrated circuits, programmable processors and/or logic) operable to forward network packets based on a forwarding information base 51 generated and installed by control plane 66. Control plane 66 provides protocols and process for interacting with other devices, such as exchanging routing information, network status, and the like, for performing route resolution and generation of FIB 51 for installation within data plane 65. In this way, high-level operation and low-level forwarding decisions are logically partitioned between control plane 66 and data plane 65 of access node 17, respectively.

In the illustrated example of FIG. 2, access node 17 may correspond to any of the access nodes illustrated in FIG. 2A or FIG. 1. Access node 17 is shown connected (e.g., through ports included within access node 17) to access node 17'. However, access node 17 may alternatively, or in addition, be connected to one or more servers 12, one or more storage devices 41, or one or more other devices, as illustrated in FIG. 2A. Access node 17 may include a plurality of processing cores, a network interface (e.g., an Ethernet interface) to connect directly to a network, and a plurality of host or device interfaces (e.g., PCI-e interfaces) to connect directly to other access nodes (e.g., access node 17'), to servers 12, or to storage devices 41.

Access node 17 also includes a run-to-completion data plane operating system (OS) 62 executing on two or more of the plurality of processing cores. Data plane OS 62 provides data plane software 64 an execution environment for a run-to-completion software function invoked on data plane OS 62 to process a work unit. In some examples, as illustrated in FIG. 2B, data plane OS 62 provides a control plane 66 including a control plane software stack executing on data plane OS 62. As illustrated, the control plane software stack includes a hypervisor 80, a multi-tasking control plane OS 82 executing on hypervisor 80, and one or more control plane service agents 84 executing on control plane OS 82. Hypervisor 80 may operate to isolate control plane OS 82 from the work unit and data processing performed on data plane OS 62. Control plane service agents 84 executing on control plane OS 82 comprise application level software configured to perform set up and tear down of software structures to support work unit processing performed by the software function executing on data plane OS 62. Further details of access node 17 (or similarly-described DPUs) may be found in previously-referenced U.S. patent application Ser. No. 16/031,945, filed Jul. 10, 2018, entitled "Data Processing Unit for Stream Processing".

Forwarding information base (FIB) 51 may represent a forwarding table, programmed by control plane 66, used to find the proper output port or network interface for use in forwarding a packet. Forwarding hardware 52 (labeled "Forwarding ASICS 52" in FIG. 2B) may be implemented through programmable switching ASICs that switch or otherwise forward packets between input ports and output ports based on forwarding information that programmed into FIB 51. Accordingly, one or more of FIB 51 and forwarding hardware 52 may be implemented as hardware or programmable hardware devices, and may be considered to be part of data plane 65.

As described herein, and in some examples, when node 17 detects an inoperable link to another network device, forwarding hardware 52 within data plane 65 identifies an alternative path that avoids the inoperable link, and forwarding hardware 52 may forward the network packets to other access nodes 17 over the alternative path. In some examples, forwarding hardware 52 may identify the alternate path with little or no involvement from control plane 66, and without waiting for control plane 66 to update FIB 51 to account for the inoperable link.

Figure 3A:
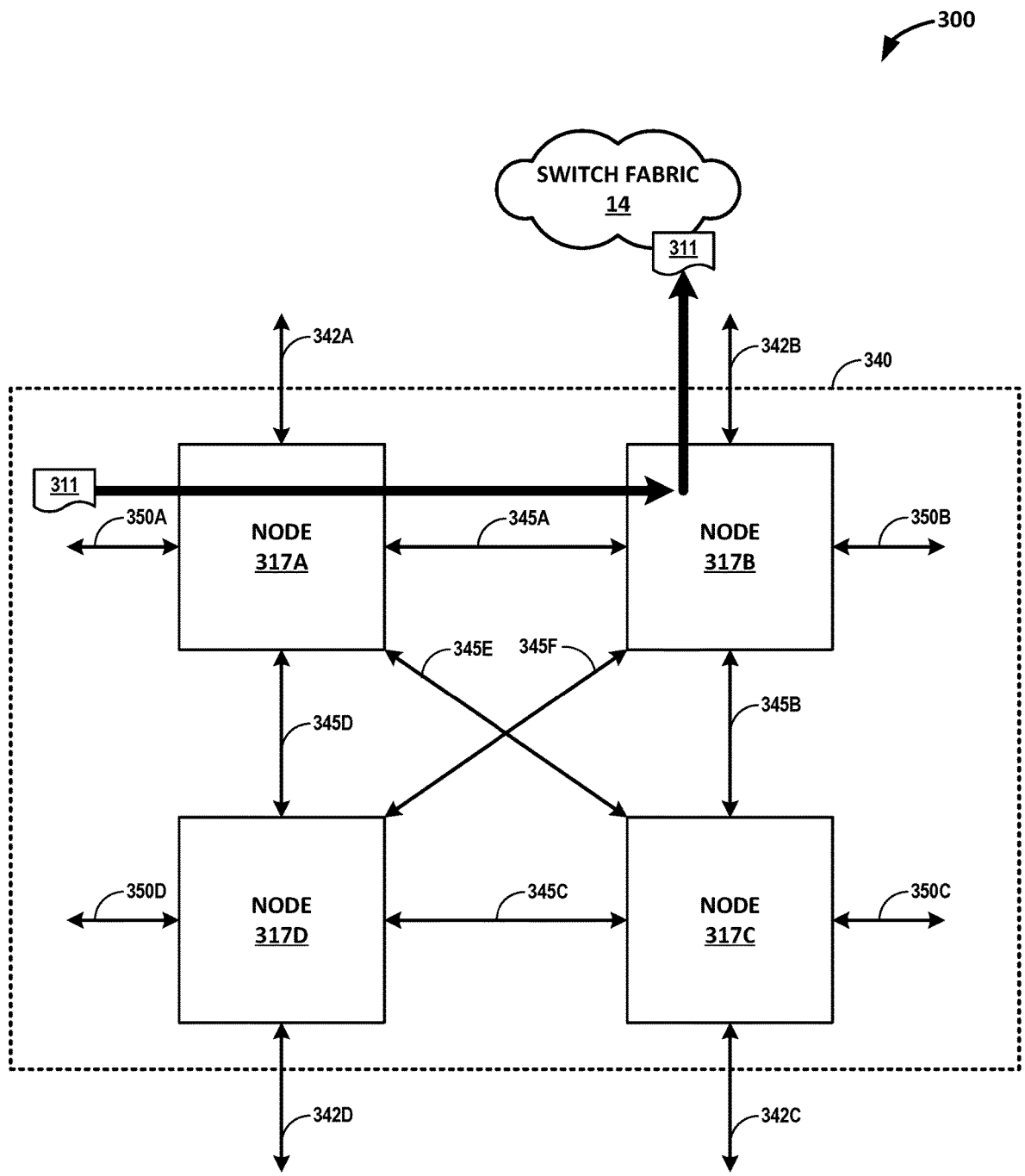
FIG. 3A is a block diagram illustrating a number of nodes connected in a mesh design, in accordance with one or more aspects of the present disclosure.

In some examples, forwarding hardware 51 of access node 17 may store information within a packet about the path that network packet has taken while traversing a group of access nodes 17 (e.g., within NSCU 40 of FIG. 2A or within a logical or physical rack), such as when that network packet is forwarded along an alternative path to thereby avoid an inoperable link. By storing information about the alternative path taken (e.g., within the packet itself), the forwarding hardware 51 of access nodes 17 can more easily determine which access nodes have already forwarded a network packet, thereby enabling later access nodes 17 to avoid forwarding network packets along inefficient paths, such as in a loop within the group of access nodes. FIG. 3A is a block diagram illustrating a number of nodes connected in a mesh design, in accordance with one or more aspects of the present disclosure. Each of the nodes 317A, 317B, 317C, and 317D (collectively "nodes 317") are network devices, and may correspond to each of nodes 17 described and illustrated in connection with FIG. 1 and FIG. 2A, and may be implemented in the same or in a similar manner. In some examples, each of nodes 317 may include capabilities for performing lookups and forwarding packets within a network; accordingly, each of nodes 317 may be capable of parsing packets, processing packet headers in a forwarding pipeline, and performing other processing. Each of nodes 317 may be implemented in a manner that includes one or more features of the access nodes described in connection with U.S. patent application Ser. No. 16/352,492, filed Mar. 13, 2019, entitled "Flexible Processing Of Network Packets," the entire content of which is incorporated herein by reference.

In FIG. 3A, each of nodes 317 are connected to each other by various links, including links 345A, 345B, 345C, 345D, 345E, and 345F (collectively "links 345"). Each of links 345 may correspond to one or more of inter-access node group links 44 and/or intra-access node group links 46, as described in connection with FIG. 2A. In other words, while in some examples each of nodes 317 illustrated in FIG. 3A may be included within the same access node group 19, in other examples, nodes 317 may span multiple access node groups 19. In FIG. 3A, nodes 317 are each included within node group 340, which may correspond to an access node group 19, an NSCU 40, a logical rack, a physical rack, or other appropriate grouping. Such groupings may include multiple access node groups 19. In one specific example, node group 340 may correspond to a rack that has sixteen nodes 317 connected by links 345 in a full-mesh configuration. For simplicity and ease of illustration, however, FIG. 3A is illustrated with four nodes 317 included within node group 340.

Each of nodes 317 are connected to one or more servers, storage devices, or other devices within node group 340 by links 350A, 350B, 350C, and 350D (collectively "links 350"). Each of links 350 may correspond to connections 50 as described and illustrated in connection with FIG. 2A. Further, each of nodes 317 are connected to switch fabric 14 via connections 342A, 342B, 342C, and 342D (collectively "connections 342"). Each of connections 342 may correspond to connections 42 as described and illustrated in connection with FIG. 2A.

In the example of FIG. 3A, network packet 311 arrives at node 317A destined for a device within switch fabric 14, and takes a path from node 317A through node 317B to switch fabric 14. Although the examples described herein primarily describe network packet 311 as arriving at link 350A with a destination within switch fabric 14, in other examples, network packet 311 or other network data units may arrive within different nodes 317 for routing to other destinations. Further, such network data units may arrive from switch fabric 14 (e.g., over one or more of connections 342) with a destination within switch fabric 14, or with a destination within one or more servers 12 or elsewhere.

In examples where each of links 345 are operable, nodes 317 may route network packet 311 to a destination within switch fabric 14 over the minimum cost path. For instance, in the example of FIG. 3A, node 317A receives network packet 311 over link 350A. Node 317A evaluates a destination address included within network packet 311 and determines how to forward network packet 311 to its destination. In some examples, node 317A selects a path from the programmed paths based on multiple fields within network packet 311, such as the source address, destination address, protocol, source port, and destination port. In some examples, the path selected by node 317A is a minimum cost path (e.g., selected pursuant to an equal-cost multi-path (ECMP) routing strategy). Where there are multiple minimum cost paths, node 317A may randomly select one of the multiple minimum cost paths.

In the example of FIG. 3A, node 317 identifies link 345A as the selected path (e.g., as the minimum cost path). Node 317 maps the identified path to an egress port of node 317A, and specifically, network packet 311 is mapped to an egress port associated with link 345A for forwarding to node 317B. Node 317A forwards network packet 311 over link 345A. Network packet 311 is received by node 317B.

Node 317B then follows a similar process to determine the next hop for forwarding network packet 311 to its destination, and again may evaluate fields within network packet 311 to determine an egress port of node 317B. In the example of FIG. 3A, node 317B maps network packet 311 to a port associated with connection 342B, and node 317B forwards network packet 311 over that port (e.g., to switch fabric 14).

Figure 3B:
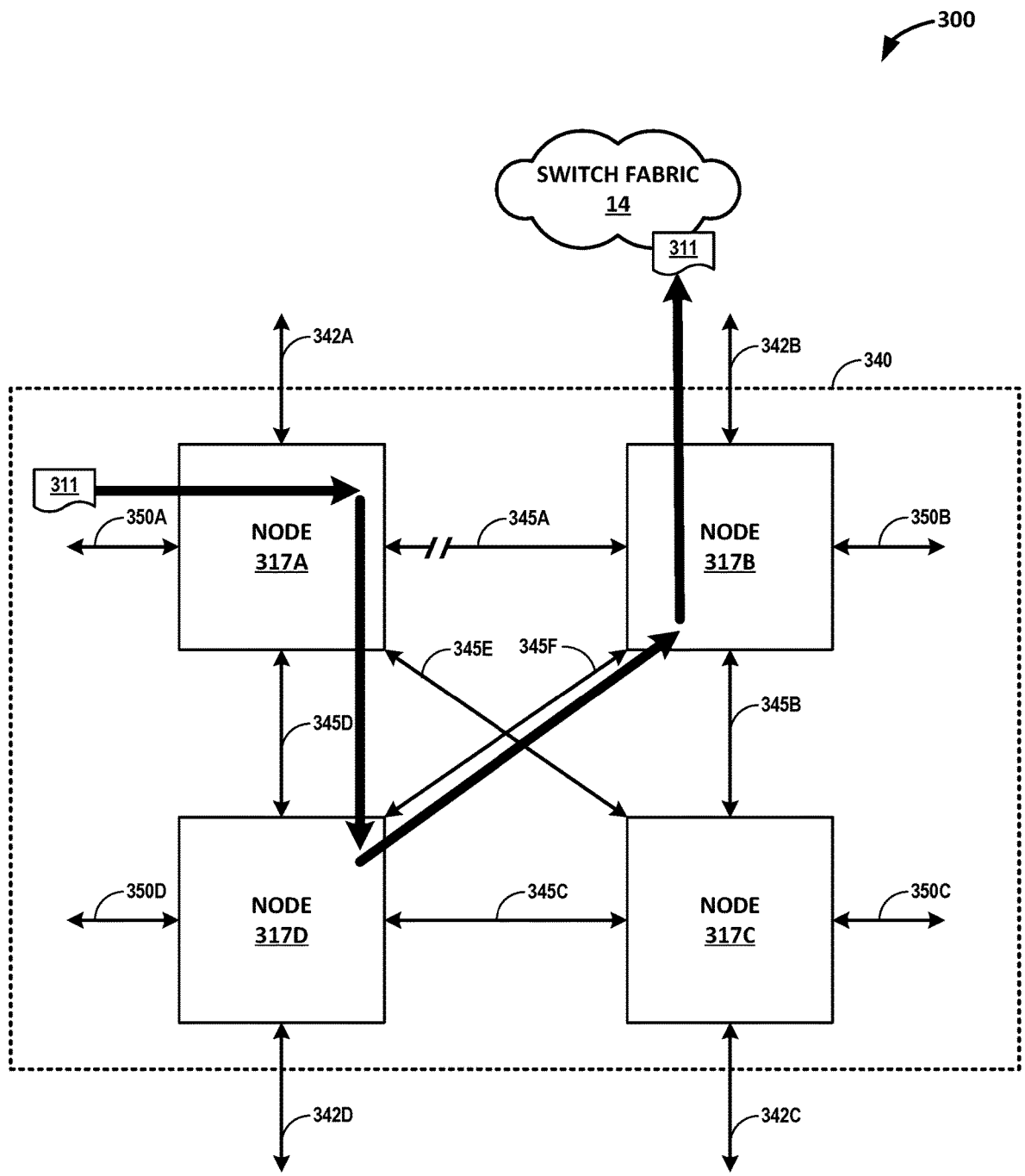
FIG. 3B is a block diagram, similar to FIG. 3A, illustrating a number of nodes, where one of the paths between the nodes is inoperable, in accordance with one or more aspects of the present disclosure.

FIG. 3B is a block diagram, similar to FIG. 3A, illustrating a number of nodes, where one of the paths between the nodes is inoperable, in accordance with one or more aspects of the present disclosure. Specifically, in the example of FIG. 3B, link 345A connecting node 317A and node 317B is inoperable, as indicated by the discontinuity in the line representing link 345A between node 317A and node 317B.

Normally, to address inoperable links or port failures such as the failure or inoperability of link 345A illustrated in FIG. 3B, control plane software may reprogram forwarding tables to thereby route, along new paths, packets that would otherwise be forwarded along link 345A if link 345A was operable. In such a system, and in the case of a failure or inoperability of a path (e.g., of link 345A), node 317A may receive network packet 311 over link 350A and based on data within network packet 311, determine how to forward network packet 311 to its destination. Node 317A may determine that link 345A is the minimum cost path. There are other paths to node 317B and switch fabric 14 (e.g., through node 317D and through node 317C), but those paths might not be equal cost paths.

In some examples that can be described with reference to FIG. 3B, since link 345A is inoperable, node 317A might drop network packet 311 or mark network packet 311 to be dropped. To address the inoperability of link 345A, node 317A or another device might notify the control plane (e.g., through an interrupt) that link 345A or the egress port associated with link 345A is down or inoperable. The control plane eventually reconverges and determines a new path, and the forwarding table is then programmed with the new path, which avoids link 345A for other network packets that might previously identify link 345A as a minimum cost path.

However, it may be time-consuming for the control plane to reconverge, and during the time before the control plane reprograms and/or updates the forwarding table (e.g., FIB 51 of FIG. 2A), a significant number of packets identified for forwarding over link 345A may be dropped. Also, when the control plane updates forwarding tables to avoid link 345A, it may become apparent, outside node group 340, that one or more links, or link 345A specifically, is inoperable. In some situations, it might be advantageous to keep the existence of failures internal to node group 340 hidden, such as situations where involving the control plane, or resources controlled by the control plane, is not needed or desired.

Therefore, in accordance with one or more aspects of the present disclosure, the forwarding plane of node 317A may select alternative paths for forwarding network packet 311, and in some examples, may do so without involving control plane software of node 317A or at least prior to the control plane software having to fully recompute and install updated forwarding tables within the forwarding plane of node 317A. For instance, in another example that can be described with reference to FIG. 3B, the forwarding plane of node 317A receives network packet 311 over link 350A. The forwarding of node 317A may, as in FIG. 3A, select link 345A for forwarding network packet 311 to node 317B, since link 345A may be the most direct connection between node 317A and node 317B. However, the forwarding of node 317A may also be able to detect that link 345A is currently not operable. In some examples, node 317A may be able to detect inoperability by detecting congestion, loss of light, a severed connection, or other causes. After detecting that link 345A is inoperable, the forwarding plane of node 317A determines an alternative path, such as link 345D, and may utilize the alternative path within an internal packet forwarding pipeline to process and forward the packet. In this way, for example, node 317A may forward network packet 311 to node 317D over an egress port associated with link 345D. Node 317D receives network packet 311 and evaluates network packet 311 to determine the next hop for forwarding network packet 311 to its destination. In the example being described, the forwarding plane of node 317D identifies the egress port associated with link 345F as the alternative path. The forwarding plane of node 317D forwards network packet 311 over link 345F to node 317B. Node 317B maps network packet 311 to a port associated with connection 342B, and node 317B forwards network packet 311 over that port (e.g., to switch fabric 14). In the example described, forwarding planes within nodes 317 determine an alternative path for network packet 311 within node group 340 to account for a failure of link 345A, and may forward network packet 311 to switch fabric 14 without dropping network packet 311, and in some cases, with little or no involvement of control plane hardware and/or software implemented by those nodes.

Figure 3C:
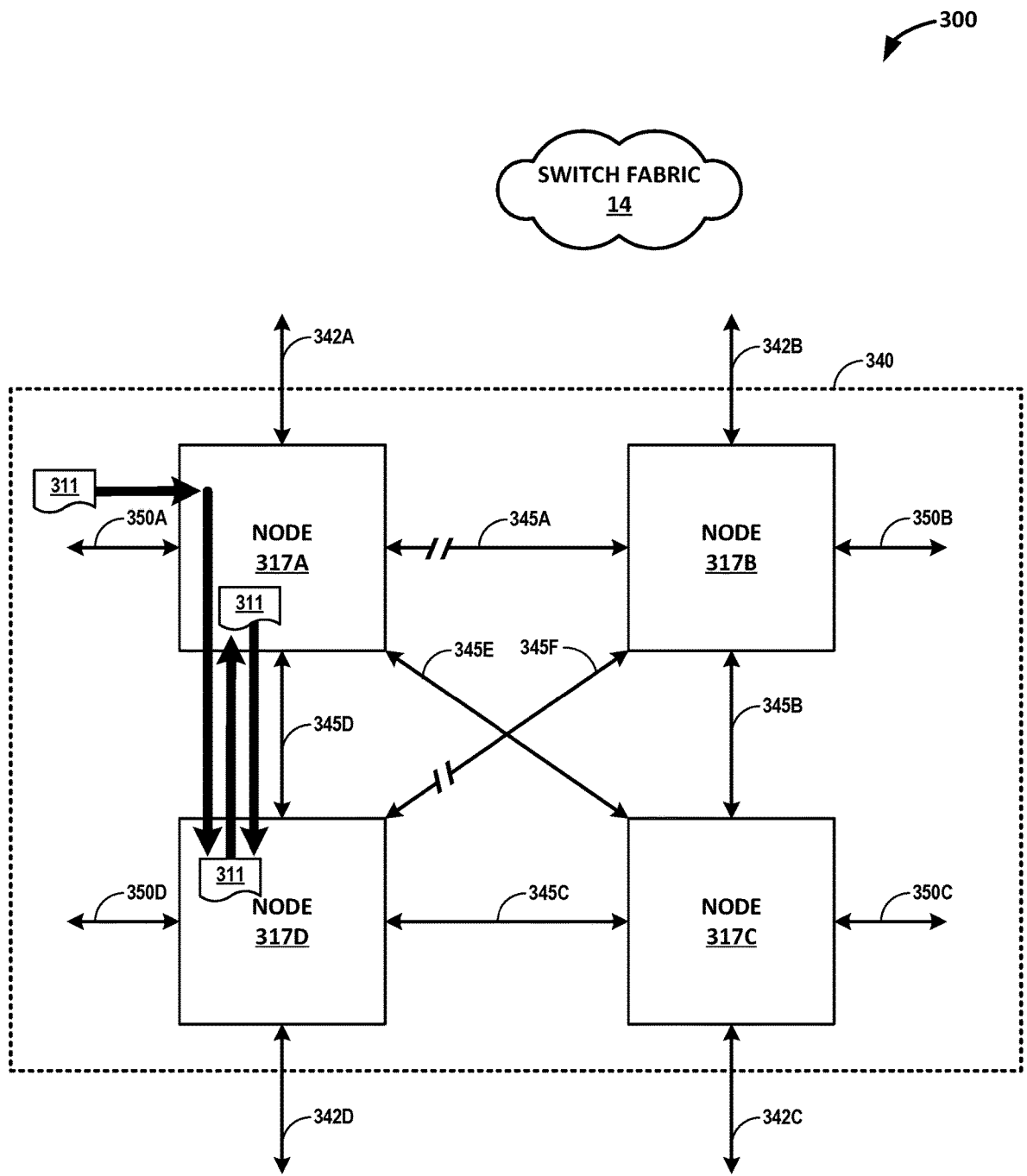
FIG. 3C is a block diagram illustrating a number of nodes, where multiple paths between the nodes are inoperable, resulting in a potential path loop, in accordance with one or more aspects of the present disclosure.

FIG. 3C is a block diagram illustrating a number of nodes, where multiple paths between the nodes are inoperable, resulting in a potential path loop, in accordance with one or more aspects of the present disclosure. Specifically, link 345A connecting node 317A and node 317B is inoperable and link 345F connecting node 317D and node 317B is inoperable, as indicated by the illustration of FIG. 3C.

In the example of FIG. 3C, node 317A may attempt to route network packet 311 to avoid link 345A. For instance, with reference to FIG. 3C, node 317A receives network packet 311 over link 350A. Based on an evaluation of fields within network packet 311, a forwarding plane within node 317 selects the path over link 345A for forwarding network packet 311 to its destination. However, the forwarding plane within node 317A determines that link 345A is not operable. The forwarding plane within node 317A therefore determines an alternative path, and identifies link 345D. Node 317D forwards network packet 311 over an egress port associated with link 345D.

Node 317D may attempt to route network packet 311 to avoid link 345F. For instance, again referring to FIG. 3C, node 317D receives network packet 311 and the forwarding plane determines, based on the destination address included within network packet 311, the minimum cost path from node 317D to the destination. The forwarding plane within node 317D identifies link 345F as a result of this determination, since link 345F leads directly to node 317B. However, the forwarding plane within node 317D also determines that link 345A is not operable, so node 317D determines an alternative path. In the example of FIG. 3C, the forwarding plane determines that the alternative path is link 345D. The forwarding plane of node 317D forwards network packet 311 over link 345D back to node 317A.

Node 317A and node 317D may pass network packet 311 back and forth in a loop. For instance, still referring to FIG. 3C, node 317A receives network packet 311 from node 317D, again evaluates network packet 311, and determines link 345A is the minimum cost path. But node 317A has already determined that link 345A is not operable. The forwarding plane of node 317A therefore chooses link 345D as the alternative path, and forwards network packet 311 over link 345D to node 317D. Node 317D again evaluates network packet 311, determines that link 345F is not operable, and again chooses link 345D as the alternative path. As a result, in the example of FIG. 3C, network packet 311 is caught in a loop between node 317A and node 317D, and network packet 311 may be forwarded between the two nodes repeatedly.

Accordingly, the examples described in connection with FIG. 3B, and FIG. 3C illustrate that nodes 317 may be able to avoid relying on the control plane to reconverge to determine new paths that avoid inoperable links, and as a result, may therefore avoid dropping packets during the time before the control plane reconverges. However, as illustrated in FIG. 3C, the manner in which perform such operations is, as described in connection with FIG. 3B, susceptible to packets being forwarded in an inefficient and possibly continuous loop.

Figure 4A:
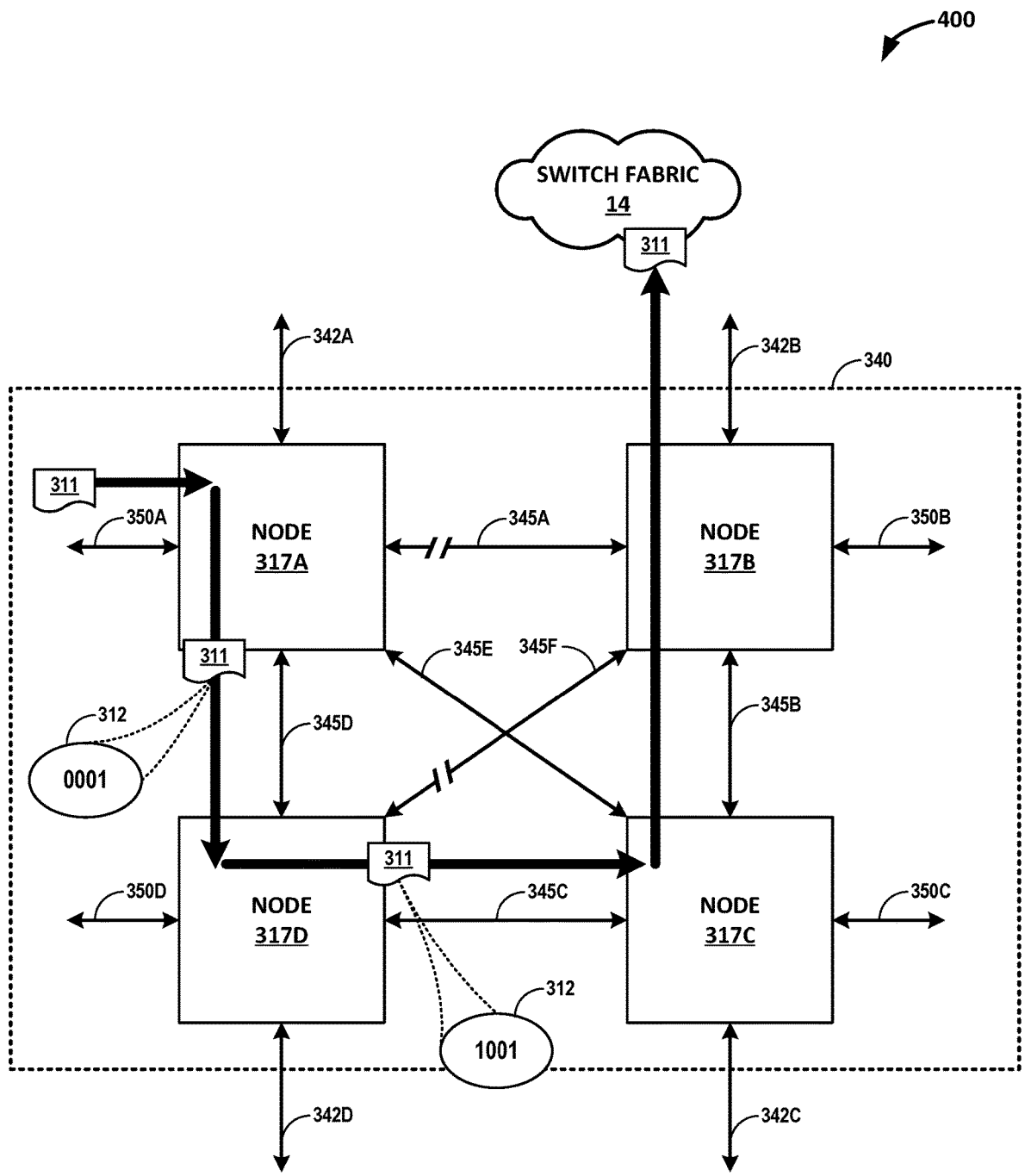
FIG. 4A is a block diagram illustrating a number of nodes and links between the nodes, where multiple paths between the nodes are inoperable, but where a procedure is employed to avoid path loops, in accordance with one or more aspects of the present disclosure.

FIG. 4A is a block diagram illustrating a number of nodes and links between the nodes, where multiple paths between the nodes are inoperable, but where a procedure is employed to avoid path loops, in accordance with one or more aspects of the present disclosure. In the example of FIG. 4A, and just as in FIG. 3C, link 345A connecting node 317A and node 317B is inoperable and link 345F connecting node 317D and node 317B is inoperable.

In the example of FIG. 4A, and in accordance with one or more aspects of the present disclosure, nodes 317 may perform a discovery procedure to identify each of nodes 317 within node group 340. For instance, in the example of FIG. 4A, each of nodes 317 determines (e.g., at bootup) the topology or arrangement of nodes 317 within node group 340. To do so, each of nodes 317 may exchange information to discover other devices within node group 340. Each of nodes 317 may also enumerate each of the other nodes 317, and collectively agree on way to reference each other. Such procedures may be performed by or at the direction of the control plane, and may involve passing information among nodes 317 to ensure that each of nodes 317 agree on a way to reference or address each of the other nodes 317. In some examples, such a process may be performed by, or at the direction of an administrator or may be performed by a centralized controller (e.g., an SDN controller) that communicates with control plane logic executing on each of nodes 317. In other examples, each of nodes 317 may be capable of autonomously communicating to discover each of the other nodes 317 and to agree on an appropriate way to reference or address each of the other nodes 317, without the involvement of a centralized controller or administrator.

In one example, nodes 317 may agree on an addressing or numbering scheme, where each of nodes 317 is assigned a sequential number. For purposes of explanation, it is assumed that in the example of FIG. 4A, such a numbering scheme might assign the number 1 to node 317A, 2 to node 317B, 3 to node 317C, and 4 to node 317D.

One or more of nodes 317 may use knowledge of other nodes 317 to track nodes visited by a network packet. For instance, in the example of FIG. 4A, node 317A receives network packet 311 over link 350A. A forwarding plane within node 317A selects the path over link 345A for forwarding network packet 311 to its destination, but the forwarding plane of node 317A determines that link 345A is not operable. The forwarding plane of node 317A therefore determines an alternative path, and identifies link 345D. Node 317A (e.g., the forwarding plane) may store data indicating network packet 311 has visited and/or has been processed by node 317A.

To store data indicating that network packet 311 has visited node 317A, one or more of nodes 317 may insert data within network packet 311. For instance, in some examples, the forwarding plane (e.g., forwarding hardware 52 of FIG. 2A) of node 317A may store data within network packet 311 by including visited nodes vector 312 within network packet 311. Visited nodes vector 312 may be a series of bits, where each bit is associated with a different one of nodes 317. In such an example, visited nodes vector 312 may be encoded to have a bit associated with each of nodes 317, so that in the example of FIG. 4A, visited nodes vector 312 may be four bits in length, to correspond to the four nodes 317 included within node group 340 of FIG. 4A. Bit one of visited nodes vector 312 (e.g., the least significant bit) might be understood by each of nodes 317 to be associated with node 317A, since, as described above, nodes 317 may have assigned the number 1 to node 317A. Similarly, nodes 317 may each understand that bit two is associated with node 317B, bit three with node 317C, and bit four (e.g., the most significant bit) with node 317D. Accordingly, before or during the time that node 317A forwards network packet 311 to node 317D over link 345D, node 317A may modify network packet 311 to include a four-bit vector (i.e., visited nodes vector 312) within network packet 311. In the example of FIG. 4A, node 317A sets bit 1 to 1, and leaves the remaining bits with a value of 0, as illustrated in FIG. 4A. In the example being described, visited nodes vector 312 vector indicates that network packet 311 has visited node 317A, but has not visited any of node 317B, node 317C, and node 317D. Although in the example being described visited nodes vector 312 is stored within network packet 311, in other examples, visited nodes vector 312 or data similar to that included within visited nodes vector 312 may be stored elsewhere, such as in storage accessible to each of nodes 317, or in data distributed amongst nodes 317.

In some examples, nodes 317 may encode some or all of network packets 311 with visited nodes vector 312, even when no path failures have been detected. However, in other examples, each of nodes 317 (e.g., the forwarding planes of such nodes 317) may insert visited nodes vector 312 into network packet 311 only when a failure is discovered and when an alternative path is taken. In other words, in such examples, network packet 311 might not contain visited nodes vector 312 if there are no path failures encountered by any of nodes 317. However, when the first path failure is encountered, the node 317 that identifies the path failure may insert visited nodes vector 312 into network packet 311. Thereafter, any of nodes 317 that receive network packet 311 may determine that network packet 311 includes visited nodes vector 312, and may update visited nodes vector 312 to indicate that network packet 311 has visited that node 317. By including visited nodes vector 312 only when a path failure is encountered, network packet 311 may be encoded normally when node group 340 includes no path failures, and as a result, may avoid consuming additional bandwidth by including visited nodes vector 312 within network packet 311.

Referring again to FIG. 4A, the forwarding plane of node 317D may determine a forwarding path for network packet 311 based on visited nodes vector 312. For instance, in FIG. 4A, node 317D receives network packet 311 from node 317A over link 345D. The forwarding plane of node 317D determines, based on the destination address included within network packet 311, that link 345F is the minimum cost path from node 317D to the destination. However, the forwarding plane of node 317D also determines that link 345F is not operable, so the forwarding plane determines an alternative path. In the example of FIG. 4A, node 317D may determine that one alternative path is link 345D. However, the forwarding plane of node 317D may also determine, based on visited nodes vector 312, that link 345D leads back to node 317A, which is a node that has been previously visited. Accordingly, the forwarding plane of node 317D rejects link 345D as an alternative path, and chooses link 345C as an alternative path, since link 345C is also along a path leading to the destination for network packet 311, and node 317C is not identified by visited nodes vector 312 as having already been visited. By choosing link 345C as an alternative path, node 317D avoids a loop similar to that illustrated in connection with FIG. 3C.

Node 317D may update visited nodes vector 312 and forward network packet 311 to its destination. For instance, again referring to FIG. 4A, the forwarding plane of node 317D updates visited nodes vector 312 to reflect that network packet 311 has visited node 317D. To do so, node 317D (e.g., forwarding hardware 52) sets the bit associated with node 317D, which in the example being described, is the most significant of the four bits of visited nodes vector 312. Accordingly, when network packet 311 leaves node 317D, visited nodes vector 312 has a value of "1001," as illustrated in FIG. 4A. Node 317D maps network packet 311 to a port associated with link 345C and forwards network packet 311 to node 317C. Node 317C receives network packet 311, evaluates network packet 311, and the forwarding plane of node 317C determines that link 345B is the minimum cost path to the destination for network packet 311. Node 317C maps network packet 311 to a port associated with link 345B and forwards network packet 311 over link 345B to node 317B. Node 317B maps network packet 311 to a port associated with connection 342B, and the forwarding plane of node 317B forwards network packet 311 over that port to a destination within switch fabric 14.

Node 317B may remove visited nodes vector 312 from network packet 311. For instance, still referring to FIG. 4A, node 317B may determine that since network packet 311 is being forwarded out of node group 340, it may be appropriate to remove visited nodes vector 312 network packet 311. In some examples, visited nodes vector 312 is included within network packet 311 for the benefit of and/or use by nodes 317 within group 340 to avoid packets visiting nodes 317 more than once. However, including visited nodes vector 312 within network packet 311 may increase the size of network packet 311, so including visited nodes vector 312 within network packet 311 may consume bandwidth. If visited nodes vector 312 is no longer needed, which may be the case when network packet 311 leaves node group 340, it may be appropriate for visited nodes vector 312 to be removed from network packet 311. Accordingly, each of nodes 317 may be configured to identify situations in which network packet 311 is being forwarded outside of node group 340, and in such situations, visited nodes vector 312 may be removed from network packet 311.

As suggested by the illustration of FIG. 1, network 400 may include additional node groups 340, and each of such node groups 340 may follow a similar procedure to address path failures within each such additional node group. Multiple node groups 340 may therefore apply techniques described herein in a distributed and/or segmented fashion across system 8 and/or data center 10 illustrated in FIG. 1.

Further, in some examples, a forwarding plane of one or more of nodes 317 within a node group 340 might notify a control plane about some path failures, and enable the control plane to recompute forwarding information and account for a failure of an internal path within one or more node groups 340. For instance, the forwarding plane of one or more of nodes 317 might notify the control plane for such nodes about path failures that have persisted for a sufficient length of time. In other examples, one or more forwarding planes might notify the control plane about specific types of path failures in some cases. Once the control plane has recomputed forwarding information, use of visited nodes vector 312 might no longer be needed, until a new failed path arises.

Figure 4B:
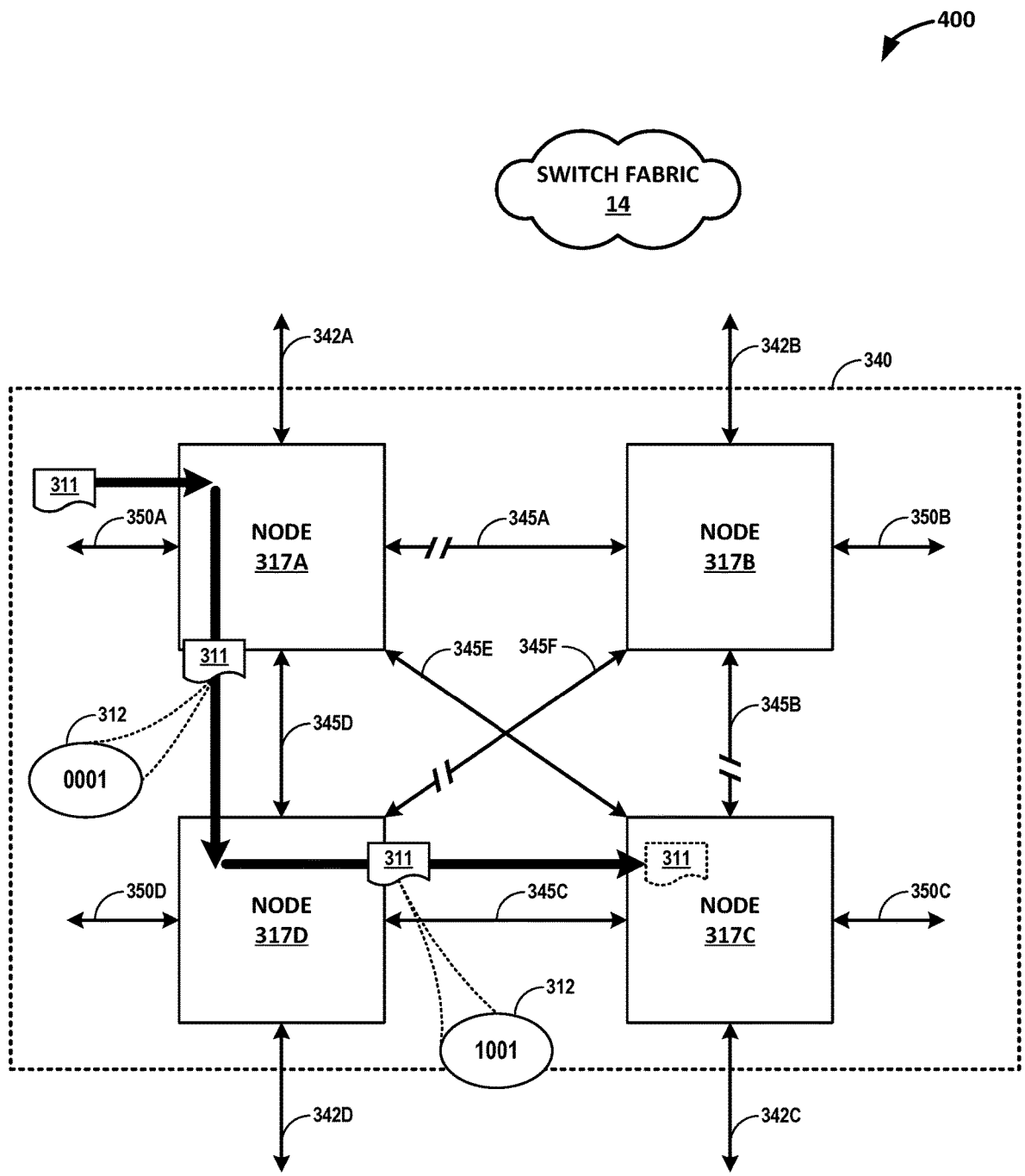
FIG. 4B is a block diagram illustrating a number of nodes and links between the nodes, where multiple inoperable paths between the nodes prevent network packets from being routed to their destination, in accordance with one or more aspects of the present disclosure.

FIG. 4B is a block diagram illustrating a number of nodes and links between the nodes, where multiple inoperable paths between the nodes prevent network packets from being routed to their destination, in accordance with one or more aspects of the present disclosure. In the example of FIG. 4B, link 345A connecting node 317A and node 317B is inoperable, link 345F connecting node 317D and node 317B is inoperable, and link 345B connecting node 317C and node 317B is inoperable.

In the example of FIG. 4B, and as in FIG. 4A, each of nodes 317 may perform a discovery procedure to discover and identify each other, and in some examples, agree upon a numbering scheme to identify each other. Also as in FIG. 4A, node 317A may receive network packet 311, determine that link 345A is inoperable, set bit 1 of visited nodes vector 312 within network packet 311, and forward network packet 311 to node 317D. Similarly, node 317D may receive network packet 311 from node 317A, and choose link 345C as a forwarding path, since link 345F is inoperable and link 345D leads to already-visited node 317A. Accordingly, node 317D may set bit 4 of visited nodes vector 312 within network packet 311, and forward network packet 311 to node 317C.

In the example of FIG. 4B, and in accordance with one or more aspects of the present disclosure, node 317C may determine that no operable path leading to the destination for network packet 311 exists. For instance, in the example of FIG. 4B, node 317C receives network packet 311 from node 317D. The forwarding plane of node 317C evaluates network packet 311, and determines that link 345B is the minimum cost path to the destination for network packet 311, but link 345B is not operable. Accordingly, the forwarding plane of node 317C may consider link 345E as an alternative path, but that forwarding plane determines, based on visited nodes vector 312, that it leads to previously-visited node 317A. Similarly, the forwarding plane of node 317C may consider link 345C as an alternative path, but the forwarding plane also determines, based on visited nodes vector 312, that link 345C leads to previously-visited node 317D. Accordingly, in the example of FIG. 4C, the forwarding plane of node 317C determines that there is no appropriate path for network packet 311 that leads to its destination, since each of the paths are either inoperable, or are part of a looped path within node group 340. In such a situation, node 317C (e.g., the forwarding plane) may drop network packet 311 or mark network packet 311 to be dropped. By dropping network packet 311, node 317C avoids resources being consumed by forwarding network packet 311 along a looped path within node group 340, as illustrated in FIG. 3C.

Figure 5:
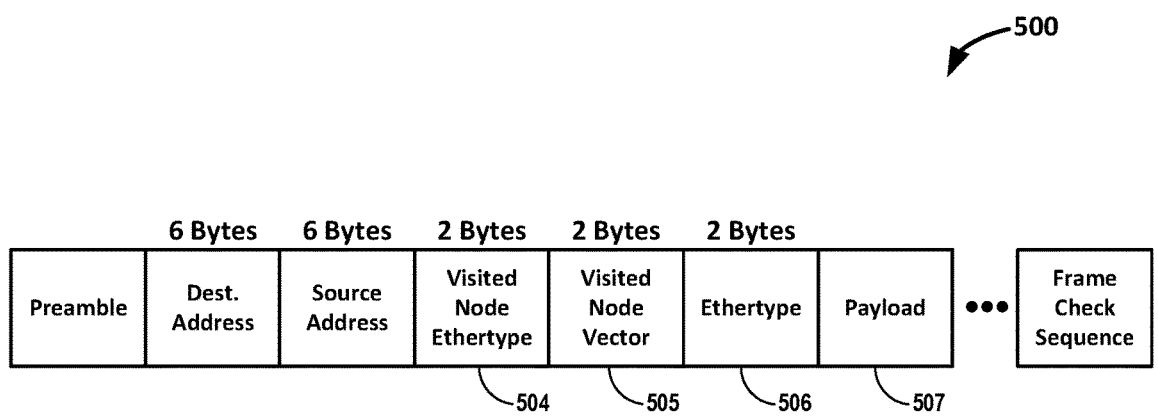
FIG. 5 is a conceptual diagram illustrating an example visited nodes vector encoded within an Ethernet frame, in accordance with one or more aspects of the present disclosure.

FIG. 5 is a conceptual diagram illustrating an example visited nodes vector encoded within an Ethernet frame, in accordance with one or more aspects of the present disclosure. As described in connection with FIG. 4A and FIG. 4B, visited nodes vector 312 may be included within a data packet, such as an ethernet frame, to identify one or more network devices or nodes 317 that have already processed and/or forwarded the data packet in a node group 340 or other grouping of devices. In some examples, a reserved encoding of the Ethertype field 504 can be used to identify a packet that includes a visited nodes vector.

FIG. 5 illustrates Ethernet frame 500 including a preamble, destination and source MAC addresses, and Ethertype field 504, visited nodes vector 505, Ethertype field 506, payload 507, and a frame check sequence. In the example shown, Ethertype field 504 identifies the type of payload carried in Ethernet frame 500. If the frame includes visited nodes vector 312, Ethertype field 504 is encoded to indicate that Ethernet frame 500 includes visited nodes vector 312, which may be included within visited nodes vector 505. In the example of FIG. 5, visited nodes vector 505 is two bytes in length, enabling visited nodes vector 312 to represent up to sixteen devices in the manner described in connection with FIG. 4A and FIG. 4B. If less than sixteen devices are included within node group 340, each of the least significant bits may represent one of the devices included within node group 340. Ethertype field 506 and payload 507 may follow visited nodes vector 505 within Ethernet frame 500. If the frame does not include visited nodes vector 312, Ethertype field 504 may be encoded normally, without indicating the presence of visited nodes vector 312.

The size of visited nodes vector 312 may represent a tradeoff between bandwidth consumption and the size of the group of network devices or nodes (e.g., node group 340) that may independently address path failures within the group, without involving the control plane. If visited nodes vector 312 is large, including visited nodes vector 312 in packets affected by path failures can consume a significant amount of bandwidth when path failures exist. Yet if visited nodes vector 312 is too small, then there might not be enough paths between network devices within a group for a sufficient number of available alternative paths that avoid a failed paths within the group of devices.

Figure 6:
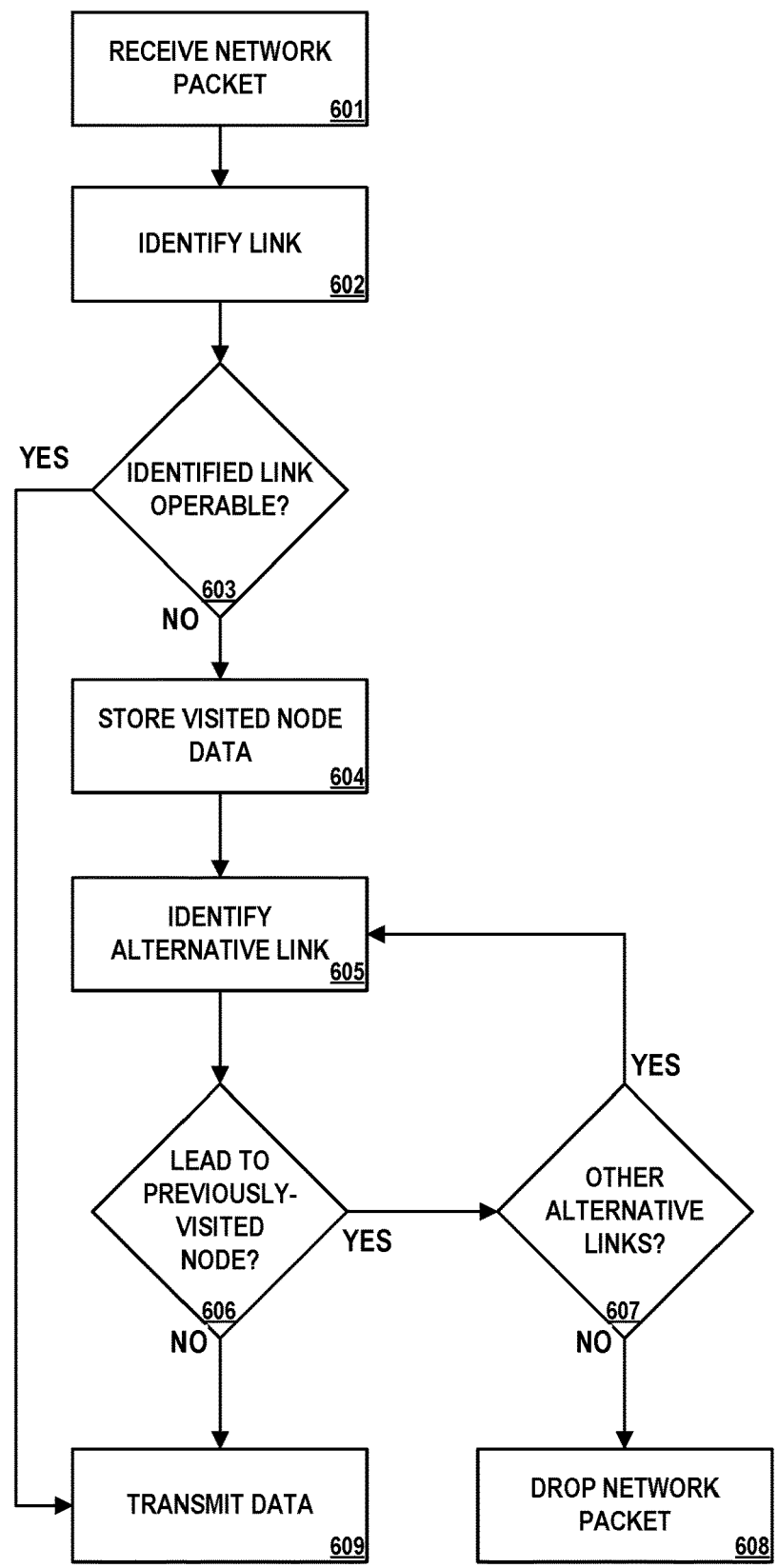
FIG. 6 is a flow diagram illustrating operations performed by an example node in accordance with one or more aspects of the present disclosure.

FIG. 6 is a flow diagram illustrating operations performed by an example node in accordance with one or more aspects of the present disclosure. FIG. 6 is described below within the context of node 317D of FIG. 4A. In other examples, operations described in FIG. 6 may be performed by one or more other components, modules, systems, or devices. Further, in other examples, operations described in connection with FIG. 6 may be merged, performed in a difference sequence, omitted, or may encompass additional operations not specifically illustrated or described.

In the process illustrated in FIG. 6, and in accordance with one or more aspects of the present disclosure, node 317D may receive a network packet (601). For example, with reference to FIG. 4A, node 317D may receive network packet 311 from node 317A over link 345D.

Node 317D may identify a link for forwarding the network packet (602). For example, in FIG. 4A, node 317D evaluates fields within network packet 311 to determine that the destination for network packet 311 is switch fabric 14. Node 317D determines that the appropriate (e.g., minimum cost) path for network packet 311 is along link 345F.

Node 317D may determine whether the minimum cost link is operable (603). For instance, with reference to FIG. 4A, if node 317D were to determine that link 345F were operable (yes path from 603), node 317D would transmit network packet 311 over link 345F to node 317B (609). However, as illustrated in FIG. 4A, link 345F is not operable, so node 317D refrains from transmitting network packet 311 (no path from 603).

Node 317D may store visited node data (604). For instance, in FIG. 4A, node 317D sets a bit within visited nodes vector 312 that is stored within network packet 311. In the example described in connection with FIG. 4A, node 317D sets the most significant bit of the four-bit visited nodes vector 312, thereby indicating that network packet 311 has visited node 317D.

Node 317D may identify an alternative link that is operable (605). For instance, in FIG. 4A, forwarding hardware 52 (see FIG. 2B) of node 317D may evaluate alternative paths and identify link 345D as a possible alternative path. In some examples, forwarding hardware 52 may access data within FIB 51 (see FIG. 2B) to identify alternative paths.

Node 317D may determine whether the alternative link leads to node that was previously visited (606). In FIG. 4A, node 317D evaluates visited nodes vector 312 within network packet 311 and determines that the least significant bit of visited nodes vector 312, which is understood to be associated with node 317A, is set to 1. Node 317D further determines that link 345D leads to node 317A. Therefore, node 317D determines that link 345D leads to a previously-visited node (yes path from 606).

Node 317D may determine whether any other alternative links exist (607). For instance, in the example of FIG. 4A, node 317D determines link 345C is another alternative path. In some examples, forwarding hardware 52 within node 317D identifies link 345C as an alternative link (605) and further determines, based on visited nodes vector 312, that link 345C does not lead to a previously-visited node (606). Accordingly, the forwarding plane of node 317D transmits network packet 311 along link 345C to node 317C (no path from 606). Forwarding hardware 52 is able to dynamically adjust the path without requiring the control plane to update FIB 51 (see FIG. 2B). However, if all of the operable, alternative paths led to previously-visited nodes, node 317D may drop the network packet, or mark the network packet to be dropped (no path from 607).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., nodes 317, node groups 340, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1, FIG. 2A, FIG. 2B, FIG. 3A, FIG. 3B, FIG. 3C, FIG. 4A, and/or FIG. 4B) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:
1. A method comprising:
receiving, by a node connected to a plurality of interconnected nodes, a network packet to be forwarded to a destination node, wherein the destination node is included within the plurality of interconnected nodes;
identifying, by the node and from among a plurality of egress links from the node, a first link along a path to the destination node;
determining, by the node, that the first link is inoperable;
storing, by the node and within the network packet, data identifying the node as having been visited;
identifying, by the node and from among the plurality of egress links from the node, a second link that is operable and is along an alternative path to the destination node, wherein identifying the second link includes evaluating visited nodes data within the network packet and determining that the second link does not connect to another node that the network packet has previously visited; and
transmitting, by the node, the network packet over the second link.

2. The method of claim 1, wherein identifying the first link includes:
identifying the first link as a minimum cost path.

3. The method of claim 1, wherein the visited nodes data is represented as a vector that includes one bit associated with each of the plurality of interconnected nodes.

4. The method of claim 1, wherein storing data identifying the node includes:
determining whether the packet includes any data identifying previously-visited nodes.

5. The method of claim 4, wherein if the packet does not include any data identifying previously-visited nodes, storing data identifying the node includes:
inserting visited nodes data into the network packet.

6. The method of claim 4, wherein if the packet does include data identifying previously-visited nodes, storing data identifying the node includes:
identifying visited nodes data within the network packet; and
updating the visited nodes data in the network packet.

7. The method of claim 1, wherein the plurality of interconnected nodes are connected so that each of the plurality of nodes can be reached by any of the other nodes by a single hop.

8. The method of claim 1, wherein identifying the second link includes identifying, by forwarding hardware within the node, the second link.

9. The method of claim 1, wherein identifying the second link includes identifying, by forwarding hardware within the node accessing a forwarding information base within the node, the second link.

10. The method of claim 1, wherein identifying the second link includes identifying, by forwarding hardware within the node and without notifying a control plane, the second link.

11. A node comprising processing circuitry and a storage device, wherein the node is connected to a plurality of interconnected nodes, and wherein the processing circuitry has access to the storage device and is configured to:
receive a network packet to be forwarded to a destination node, wherein the destination node is included within the plurality of interconnected nodes;
identify, from among a plurality of egress links from the node, a first link along a path to the destination node;
determine that the first link is inoperable;
store, within the network packet, data identifying the node as having been visited;
identify, from among the plurality of egress links from the node, a second link that is operable and is along an alternative path to the destination node, wherein identifying the second link includes evaluating visited nodes data within the network packet and determining that the second link does not connect to another node that the network packet has previously visited; and
transmit the network packet over the second link.

12. A method comprising:
receiving, by a first node included within a plurality of interconnected nodes, a network packet to be forwarded to a destination node, wherein the destination node is included within the plurality of interconnected nodes;
identifying, by the first node and from among a plurality of egress links from the first node, a first link along a path to the destination node;
determining, by the first node and based on visited node data stored within the network packet, that the first link leads to a second node that the network packet has previously visited, wherein the visited node data is represented as a vector that includes one bit associated with each of the plurality of interconnected nodes;
updating, by the first node, the visited node data to identify the first node as having been visited by the network packet;
identifying, by the first node and from among the plurality of egress links from the first node, a second link that does not connect to another node that the network packet has previously visited and is along an alternative path to the destination node; and
transmitting, by the node, the network packet over the second link.

13. The method of claim 12, wherein identifying the first link includes:
identifying the first link as a minimum cost path.

14. The method of claim 12, wherein identifying the first link includes:
determining that the first link is operable.

15. The method of claim 12, wherein identifying the second link includes:
determining that the second link is operable.

16. A system comprising:
a first node configured to:
receive a network packet to be forwarded to a destination node,
identify, from among a plurality of egress links from the first node, a first link along a path to the destination node,
determine that the first link is inoperable,
store, within the network packet, visited node data identifying the first node as having been visited by the network packet, wherein to store the visited node data, the first node is configured to insert a visited node vector into the network packet, and encode the network packet to indicate that the network packet includes the visited node vector,
identify, from among the plurality of egress links from the first node, a second link that is operable and is along an alternative path to the destination node, and
transmit the network packet over the second link; and
a second node configured to:
receive the network packet over the second link from the first node;
identify, from among a plurality of egress links from the second node, a third link along a path to the destination node, determine, based on the visited node data stored within the network packet, that the third link leads to a node that has been previously visited by the network packet;

update the visited node data to identify the second node as having been visited by the network packet, identify, from among the plurality of egress links from the second node, a fourth link that is operable and is along a second alternative path to the destination node, and transmit the network packet over the fourth link.

17. The system of claim 16, wherein to identify the first link, the first node is further configured to:

identify the first link as a minimum cost path.

* * * * *